United States Patent [19]
Tang et al.

[11] Patent Number: 5,379,227
[45] Date of Patent: Jan. 3, 1995

[54] METHOD FOR AIDING SHEET METAL FORMING TOOLING DESIGN

[75] Inventors: Sing C. Tang, Plymouth; James C. Carnes, Willis, both of Mich.

[73] Assignee: Ford Motor Company, Dearborn, Mich.

[21] Appl. No.: 994,014

[22] Filed: Dec. 21, 1992

[51] Int. Cl.⁶ .................... G06F 15/46; B21D 5/02
[52] U.S. Cl. .................... 364/472; 364/476; 29/34 R; 29/897.2; 72/347; 72/379.2
[58] Field of Search .............. 364/472, 476, 474.07; 72/347, 379.2; 29/DIG. 11, 34 R, 33.5, 897.2, 897.32

[56] References Cited

U.S. PATENT DOCUMENTS 4,811,582  3/1989  Story et al. .................... 72/60
5,128,877  7/1992  Tang .............................. 364/476

OTHER PUBLICATIONS

Journal of Applied Mechanics, vol. 100, No. 1, Mar. 1978, Analysis of Sheet Metal Stamping by a Finite-Element Method, N.-M. Wang & B. Budiansky, pp. 73–81.

ASM International, Sheet Metal Forming Modeling of Automobile Body Panels, S. C. Tang, et al., May 1988.

Primary Examiner—Paul Gordon
Attorney, Agent, or Firm—Roger L. May; Joseph W. Malleck

[57] ABSTRACT

Method and system for evaluating sheet metal forming tooling design, for use with a draw die including a punch and binder designed to form the sheet metal into a part, utilizing improved implicit time integration methods that reduce numerical instability, thereby enhancing convergence of numerical solutions. The sheet metal and tool surface of the punch are each represented as a mesh having a plurality of nodes. Contact nodes between the sheet metal mesh nodes and the tool surface mesh can be identified. A first embodiment includes minimizing discontinuities generated by unloading by determining a stress increment of a sampling point in the sheet metal mesh according to an incremental deformation theory of plasticity. A second embodiment includes modelling a draw-bead as a plurality of nonlinear elastic springs to minimize discontinuities in the spring force during unloading. A third embodiment includes filtering a relative velocity vector of at least one contact node with respect to the tool surface, to avoid frictional force oscillations due to the change in direction of the relative velocity vector during formation of the part.

18 Claims, 12 Drawing Sheets

FORMING LIMIT DIAGRAM

METHOD FOR AIDING SHEET METAL FORMING TOOLING DESIGN

Cross-Reference To Related Application

This application is related to U.S. Pat. No. 5,128,877, issued to Tang on Jul. 7, 1992, and assigned to the assignee of the present invention.

TECHNICAL FIELD

The present invention relates to sheet metal forming and, more particularly, to a method for aiding sheet metal forming tool design.

BACKGROUND ART

The conventional draw process to form a sheet into a part is generally divided into two stages: the binder-wrap stage and the punch and die closure stage. The traditional method for sheet metal forming analysis is a quasi-static method. Due to the low speed of tool travel (e.g. less than 250 mm/S), the inertia effect of a thin sheet can be ignored. As a result, a quasi-static analysis can be justified and solved by the incremental method following the progress of tool movement.

A quasi-static analysis in three-dimensional space of the punch and die contact is described in the article titled "Analysis of Sheet Metal Stamping by a Finite-Element Method" authored by N. M. Wang and B. Budiansky, published by the Journal of Applied Mechanics, Vol. 45, No. 1, March 1978. The contribution of their method solved a contact problem the quasi-static analysis by taking material derivatives of the contact forces. This, however, requires the curvature of tool surfaces, which is hard to obtain numerically. In addition, the coefficient matrix of the modified linear system governing the increment deformation of the sheet is no longer symmetric. The solution process was linearized by dividing the total punch travel distance into sufficiently small increments such that within a small interval the incremental equilibrium equation, which is approximately linear, could be solved. The method however, was based on the membrane shell theory, which has severe limitations, and the method cannot be applied to the analysis of a draw forming operation.

More recently, attempts have been made to analyze the punch and die contact utilizing crash worthiness programs based on an explicit time integration method. These programs are appropriate for structures dominated by an inertia load, such as the transient response to an automobile crash. As a result, the explicit time integration method yields inaccurate results for a sheet forming analysis without artificial adjustments for forming speeds and damping parameters which are problem dependent.

Due to severe discontinuities and the occurrence of structural instability, traditional numerical solutions often have convergence problems. It would be desirable to address and resolve these convergence problems, so as to avoid undesirable oscillation in the transient response during forming, utilizing a more reliable implicit time integration method.

SUMMARY OF THE INVENTION

It is an object of the present invention to provide an improved method for the analysis of the die closure stage of the draw forming process.

It is a further object of the present invention to provide a method for the evaluation of sheet metal forming tooling design, such as the prediction of deformation and stress distribution in a sheet at any distance of punch travel, for automotive sheet metal parts.

In carrying out the above object and other objects and features of the present invention, a method is provided for aiding sheet metal forming tool design, for use with a computer including memory, and forming tools including a draw die, punch and binder having surfaces designed to form the sheet metal into a part. The sheet metal is represented as a mesh including a plurality of nodes and associated elements. The method comprises the steps of numerically determining by the computer the sheet metal mesh nodes contacting the tool surfaces due to the punch advancing to form the part and applying a displacement increment to the nodes. The method also comprises determining by the computer a stress state at at least one sampling point associated with the elements, so as to determine whether the stress state is unloading based on an incremental deformation theory of plasticity, and determining by the computer for each unloading sampling point when the sampling point should change in the transition from a plastic state to an elastic state, so as to enhance convergence of the numerical solution of the displacement increment. These sampling points are preferably required for numerical integration to establish the tangent stiffness matrix and the nodal forces.

In further carrying out the above objects and other objects and features of the present invention, a method is provided for aiding sheet metal forming tool design, for use with a computer including memory, and forming tools including a draw die, punch and binder with a drawbead. The forming tools have surfaces designed to form the sheet metal into a part, and the sheet metal is represented as a mesh including a plurality of nodes. The sheet metal mesh also includes at least one spring node located at a boundary of the sheet metal. The method comprises the step of numerically determining by the computer the sheet metal mesh nodes contacting the tool surfaces due to the punch advancing to form the part and applying a displacement increment to the nodes. The method also comprises the step of modelling the drawbead by the computer as a plurality of nonlinear elastic springs, at least one nonlinear elastic spring being positioned at the at least one spring node and exerting an external force on the spring node which varies with nodal displacement, so as to minimize discontinuities in the spring force during unloading of the spring, thereby enhancing convergence of the numerical solution of the displacement increment.

In still further carrying out the above objects and other objects and features of the present invention, a method is provided for aiding sheet metal forming tool design, for use with a computer including memory, and forming tools including a draw die, punch and binder having surfaces designed to form the sheet metal into a part. The sheet metal is represented as mesh including a plurality of nodes and associated elements. The method comprises the steps of numerically determining by the computer the sheet metal mesh nodes contacting the tool surfaces due to the punch advancing to form the part and applying a displacement increment to the nodes. The method also comprises the steps of filtering by the computer a relative velocity vector associated with each contact node with respect to the tool surface, and determining frictional forces by the computer at the contact node utilizing the filtered relative velocity vector, to avoid oscillations due to the change in direction of the relative velocity vector of the contact node, thereby enhancing convergence of the numerical solution of the displacement increment.

Systems are also provided for carrying out the methods.

The advantages accruing to the present invention are numerous. For example, the method solves convergence problems associated with numerical solutions of existing methodologies, resulting in a prediction of deformation and stress distribution based on an implicit time integration method, which is more accurate than existing methodologies, without the need of adjusting parameters. Additionally, the method of the present invention avoids the treatment of contact nodes as being in a "sticking" or "slipping" state.

The above objects and other objects, features, and advantages of the present invention will be readily appreciated by one of ordinary skill in the art from the following detailed description of the best mode for carrying out the invention when taken in connection with the accompanying drawings.

Best Mode For Carrying Out The Invention

Figure 1:
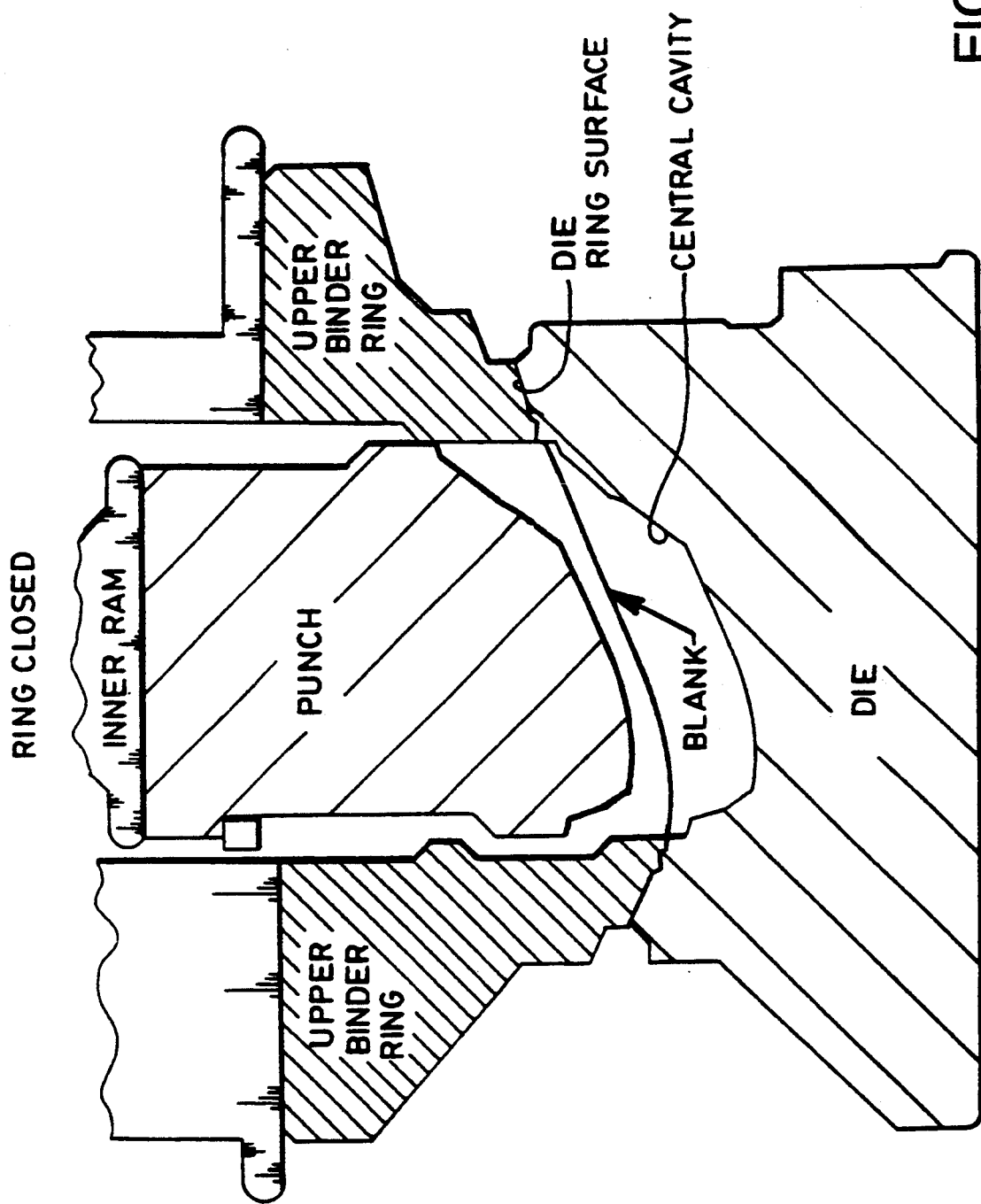
FIG. 1 a sectional view of a deep draw die apparatus for an automotive body panel in the binder wrap stage of the metal forming process, the punch being in an active state.
Figure 2:
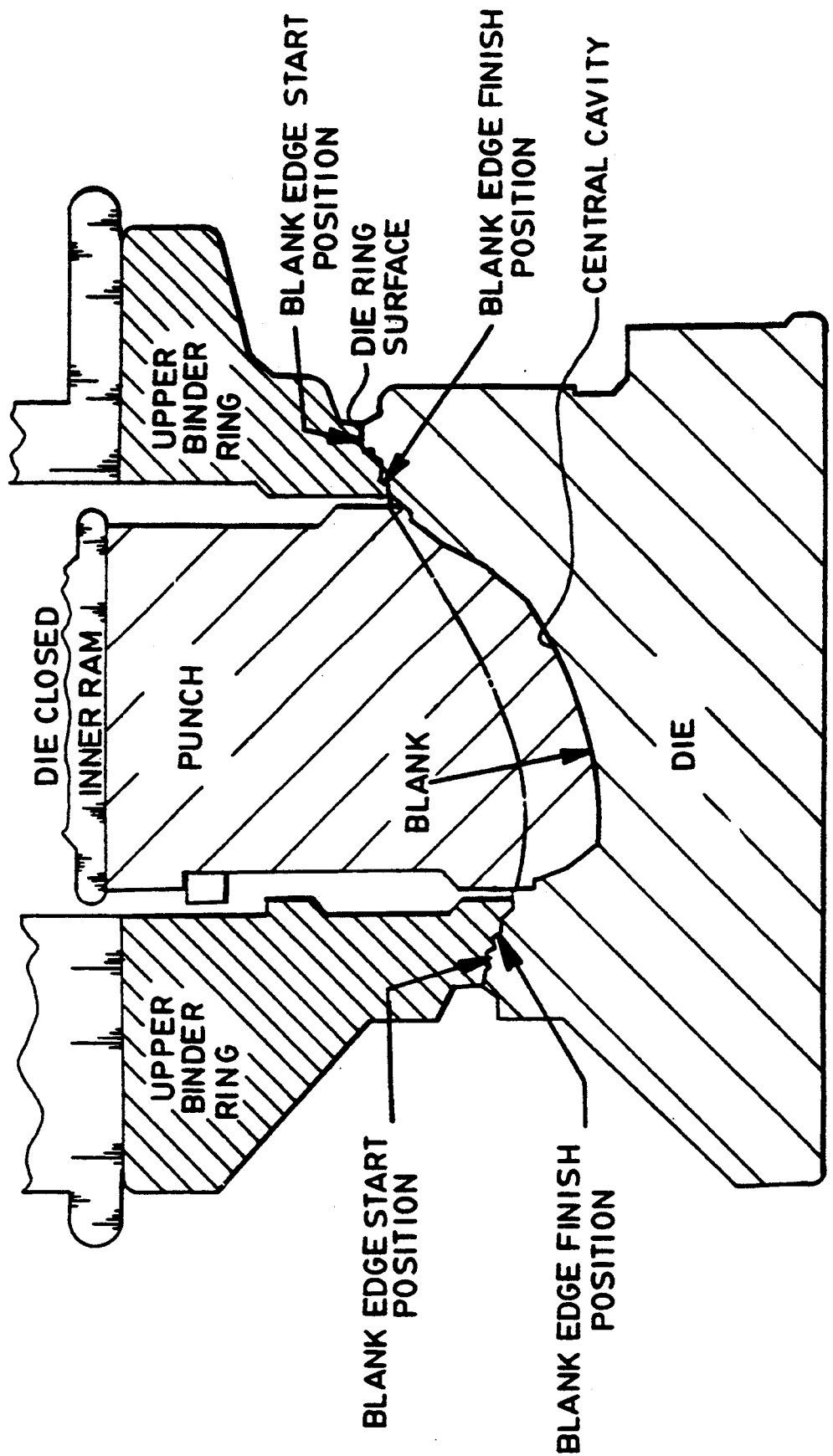
FIG. 2 is a sectional view of a deep draw die apparatus for an automotive body panel in the punch and die closure stage of the metal forming process, the punch being in an active position lowered into the bottom cavity.

Referring now to FIGS. 1 and 2, there are shown sectional views of a deep draw die apparatus for an automotive body panel in the binder wrap stage and the die closure stage, respectively, of the metal forming process. In the binder wrap, or binder set, stage best shown in FIG. 1, the binder ring is closed and holds the perimeter of the sheet metal blank. The upper binder ring lowers and sets the binder shape, also referred to as the binder wrap. In the die closure stage best shown in FIG. 2, the punch slides downward through the binder ring and presses the sheet metal blank, forming the contoured automotive body panel.

Figure 3:
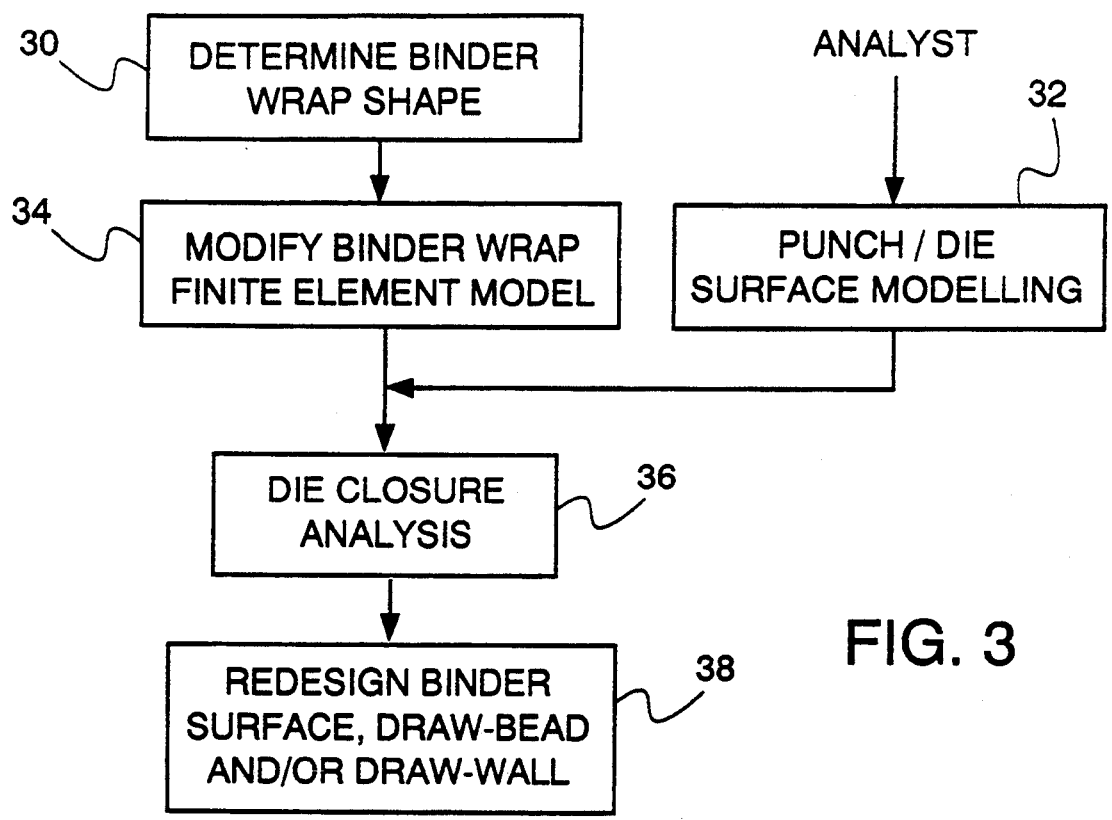
FIG. 3 is a general flowchart detailing the steps for prediction of deformation and stress distribution of the present invention.
Figure 4:
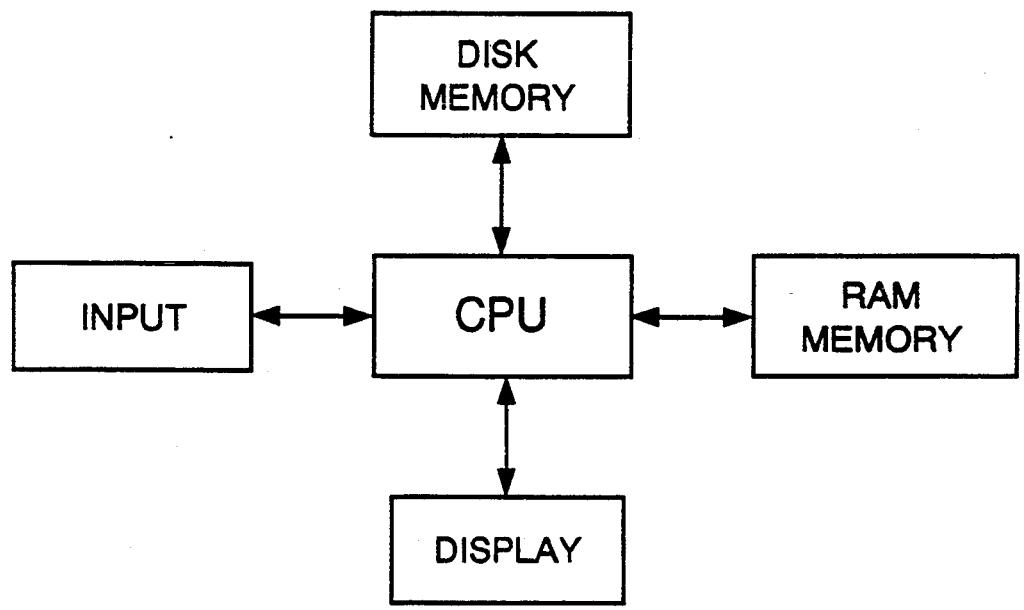
FIG. 4 is a block diagram of a computer for use with the present invention.

Referring now to FIG. 3, there is shown a flowchart detailing the steps for the prediction of the deformation and stress distribution in a draw blank of the present invention. The prediction is preferably carried out on a computer, such as a IBM RS6000 workstation, the functional block diagram of which is illustrated in FIG. 4. As shown in FIG. 4, the computer includes a CPU, a RAM or core memory, disk memory, a display or similar output, and an input means, such as a keyboard. The computer simulates the formation of automobile body panels from sheet metal. As shown, at step 30, the sheet metal deformation after binder wrap is determined. This step is necessary prior to performing die closure analysis, including prediction of sheet metal deformation and stress distribution during die closure.

After the binder wrap stage, visual analysis may show defects in binder design. For example, sheet metal draw blanks which are not initially contacted by the draw punch in a centralized location of the suspended portion of the blank are likely to form undesirable wrinkles in the blank when fully drawn. After the binder wrap stage shown in FIG. 1 the ungripped, interior of the sheet metal is virtually suspended. Its deformed shape is complex, the result of the weight of the metal and the contact of the metal with the closed binder.

Having performed the binder wrap stage, the initial contact of the punch with the suspended portion of the sheet metal is known. This is critical to knowing whether any off-center contact will be made between the punch and the suspended portion. In the preferred embodiment, step 30 is performed according to the method of determining a binder wrap disclosed in U.S. Pat. No. 5,128,877, issued to Tang on Jul. 7, 1992, and assigned to the assignee of the present invention, the specification of which is hereby expressly incorporated by reference in its entirety.

With continuing reference to FIG. 3, at step 32 punch and die surface modelling is performed. This surface modelling is achieved utilizing a software preprocessor, which could be written in the FORTRAN programming language, which transforms line data input from a designer. Typically, the designer creates binder line data and punch line data initially utilizing an appropriate CAD program. The line data represents the tool surfaces, such as the tool ridges and the like. In the preferred embodiment, the software preprocessor creates a triangular mesh establishing the connectivity of the tool surface, utilizing a nearest neighbor algorithm which fills in the surface between the points on the lines.

The tool surface triangular mesh is a plurality of interconnected triangles, the vertices of which are referred to as nodal points. Utilizing the nearest neighbor algorithm will sometimes cause inconsistency between the connectivity of the original line data and the resulting tool surface mesh, resulting in errors of shape, which are preferably corrected. The tool surface triangular mesh is then provided as an input to the die closure analysis of step 36, described in greater detail below, to test for contact between the tool surface and the sheet metal.

As shown in FIG. 3, at step 34, the binder wrap shaped finite element model determined at step 30 is modified by the software preprocessor at step 34. The binder wrap shape is also represented by a triangular mesh. During this modification step, the binder wrap finite element model mesh is refined. In other words, the analyst is allowed to alter the nodal positions of the mesh by varying the positions of the nodes. However, the modified nodal positions will still lie on the binder wrap surface determined at step 30, i.e. the surface of the binder wrap will stay the same. It should be appreciated by one of ordinary skill in the art that this modification provides the advantage of allowing the analyst to increase the density of nodes in particular areas, such as an area of high curvature, to more accurately predict strain concentration associated with the die closure stage of the metal forming process.

The step of modifying the binder wrap finite element model also preferably includes defining the constraining forces due to binder pressure and the draw-bead. Preferably, a function is defined wherein the input is nodal displacement and the corresponding output is the resulting opposing force on the node as the sheet metal is formed. Preferably, the constraining forces are modelled as an elastic-plastic spring. Still further, binder wrap finite element model modification of step 34 entails defining the sheet metal material properties, in addition to Young's modulus of elasticity and Poisson's ratio in the plastic range, and defining the friction coefficient of the metal and the tool surfaces.

With continuing reference to FIG. 3, at step 36 die closure analysis is performed. Die closure analysis according to the present invention is shown in greater detail in the flowchart of FIGS. 5a–5c. In general, the method of the present invention involves solving a sequence of force balancing problems, referred to as load steps, upon the modified binder wrap triangular mesh. At each load step, the punch advances to a new position, causing boundary condition updates for the contacting nodes. There are two kinds of contacting nodes. Nodes contacting the punch/die surface are called contact nodes, whereas nodes inside the binder contacting the upper binder ring and the binder surface on the die are called binder nodes.

Figure 6:
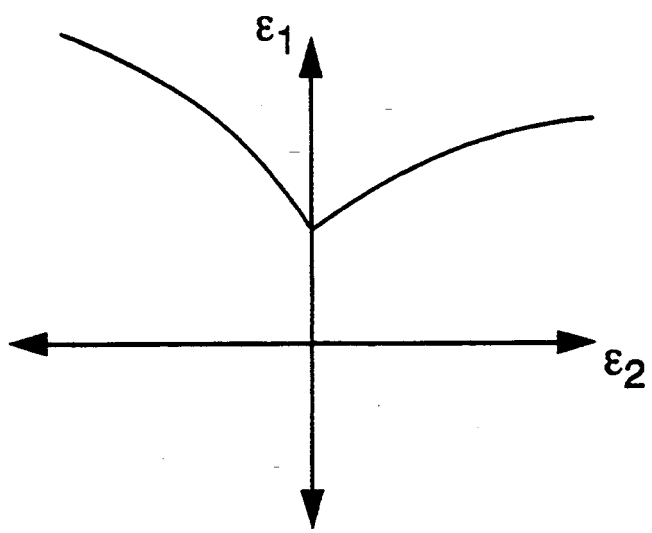
FIG. 6 is an illustration of a forming limit diagram for use with the present invention for determining unacceptable levels of strain.

At each load step, the computer searches for new nodal positions which satisfy the new boundary conditions and produce balanced internal forces and external forces (the spring and friction forces) at all nodes, i.e. until equilibrium is reached. These load steps are continued until the punch has advanced to its final position, and the automotive body panel has been formed. The search for new nodal positions is performed iteratively, with each iteration preferably producing a better result with a smaller unbalanced force. When the unbalanced force is small enough, the next load step begins and generates new boundary conditions again. Periodically during the analysis the predicted stress and deformation can be viewed to check for buckling and/or wrinkling. After the punch reaches its final position, the strain is checked to determine whether splitting or thinning of the sheet metal can occur. This can be done utilizing a forming limit diagram, such as that shown in FIG. 6 wherein $\epsilon_1$ represents the major principal strain and $\epsilon_2$ represents the minor principal strain, to detect high strain. If the strain is too high, the draw bead, binder shape and draw wall can be appropriately redesigned.

Figure 5A:
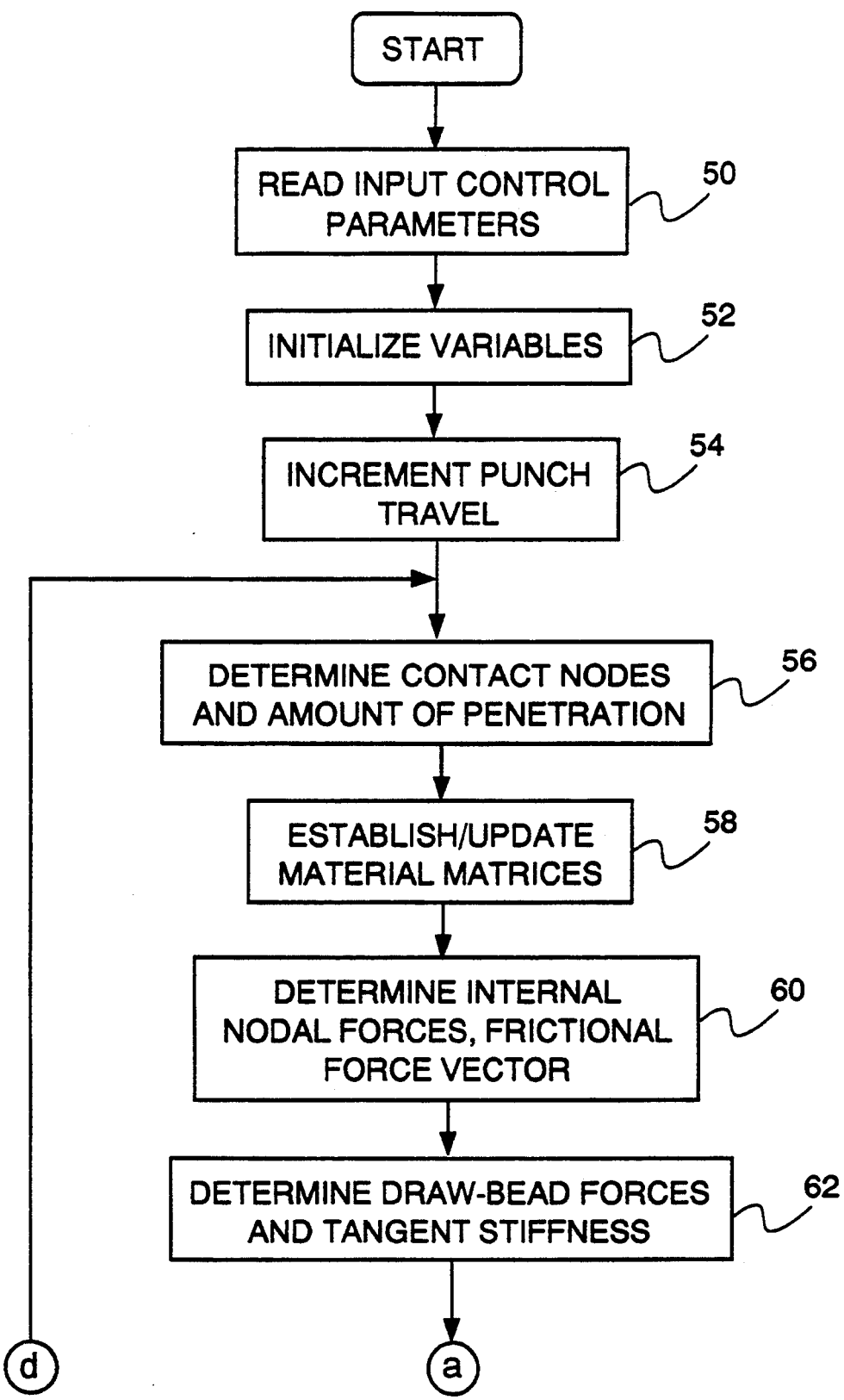
FIGS. 5a, 5b, and 5c are detailed flowcharts illustrating detailing the steps for punch and die contact analysis according to the present invention.

As best shown in FIG. 5a, at step 50 the computer is provided with data from steps 32–34 and additional control parameters, such as tolerances. As previously described, this data includes the tool surface triangular mesh from step 32 and the modified binder wrap triangular mesh from step 34. Variables are initialized to predetermined and/or default values at step 52.

With continuing reference to FIG. 5a, at step 54 the punch is advanced an incremental amount, such as 1 mm for an outer body panel. As the punch advances, the tool surface contacts the sheet metal. At step 56, the computer determines the contact nodes between the tool surface mesh and the sheet metal mesh by measuring the penetration of sheet metal nodes into the tool surface. This penetration gives rise to a boundary condition which enforces a displacement increment on the contact nodes, forcing them to the tool surface.

Figure 7A:
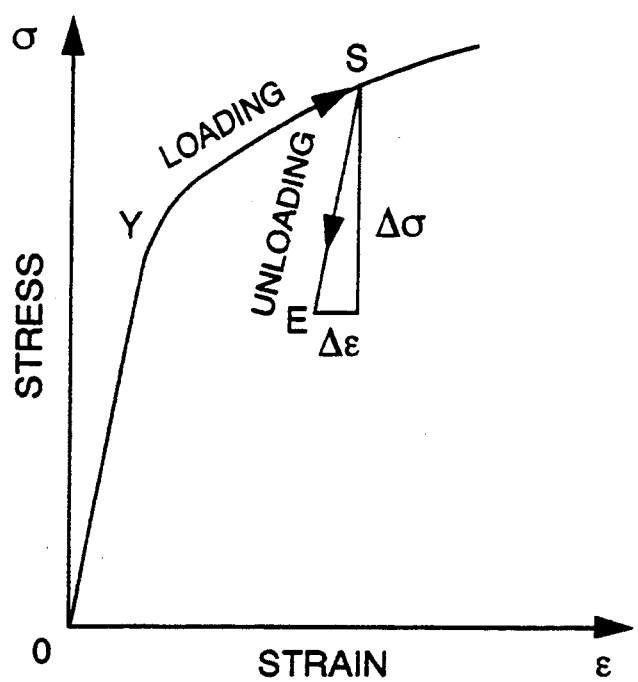
FIGS. 7a–7b are illustrations of loading and unloading paths for determining stress increments.

As shown in FIG. 5a, at step 58 the material matrices, i.e. the stress-strain relationships, are established/updated so as to ensure accuracy. To form a complex outer body panel, there may be stress unloading in the panel even before the punch reaches the final position. As best shown in FIG. 7a, path OYS represents loading and path SE represents unloading. Before the stress state can be determined, at a sampling point in the sheet detected under an unloading condition, the elastic-plastic material matrix is utilized to establish the tangent stiffness matrix, the determination of which is fully described in the paper titled "Sheet Metal Forming Modeling of Automobile Body Panels", by S. C. Tang, J. Gress and P. Ling, published in 1988 by ASM International at the Controlling Sheet Metal Forming Processes 15$^{th}$ Biennial Congress, which is hereby expressly incorporated by reference in its entirety. Once the displacement increment is solved utilizing a tangent stiffness matrix mentioned in the paper and explained in greater detail below, the strain increment at that sampling point can be obtained, based on a known strain and displacement increment relationship. The stress increment is then computed by a known assumed stress-strain increment relationship. If the computed equivalent stress increment is negative, the stress state at that point is under unloading, and the stress increment is preferably recomputed by the pure elastic stress-strain relationship according to the elastic-plastic theory.

Since the elastic-plastic material matrix, which is very soft, is used in the tangent stiffness matrix, the displacement increment and thus the strain increment would be large. After detecting unloading, existing methodologies determine the stress change ($\Delta\sigma$) from the strain increment, based on the increment elastic stress-strain relationship. The resultant stress change is, however, large even for a small change in strain ($\Delta\epsilon$), as shown in FIG. 7a. Due to this large change of the stress, it is difficult to obtain convergence using iterations to obtain equilibrium because of the inconsistency in using the elastic-plastic material matrix in establishing the tangent stiffness matrix and using the pure elastic material matrix in computing stress after the displacement increment and strain increment have been determined.

Alternatively, one may repeat the load step to set the pure elastic (instead of the elastic-plastic) material matrix in establishing the tangent stiffness matrix. However, resetting the material matrix works for sheets with only a few sampling points. To model a complex part for forming analysis requires several thousand sampling points to obtain an accurate result. Because of the interaction among the sampling points, it is difficult to be consistent for the material matrix, i.e., either pure elastic or elastic-plastic material matrix used in both establishing the tangent stiffness matrix and computing the stress increment after the solution, at every sampling point.

Figure 7B:
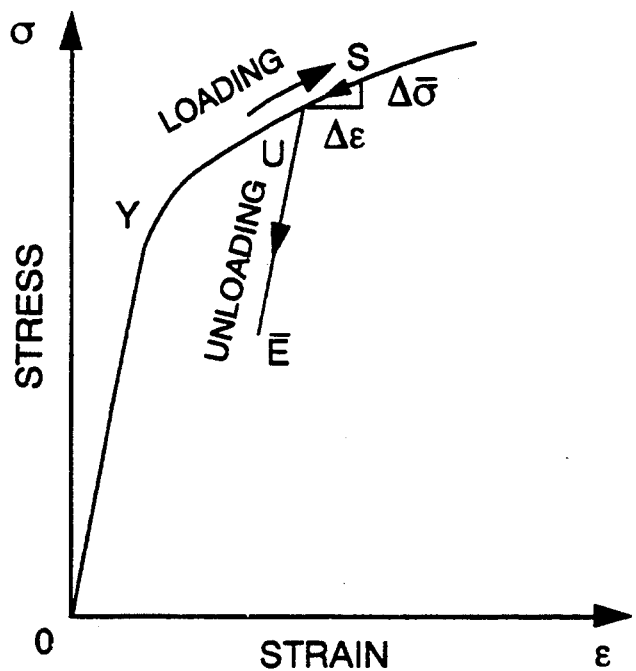

Accordingly, in the preferred embodiment, a stress change based on the incremental deformation theory of plasticity is used in the computation of the stress increment after detecting unloading, as shown in FIG. 7b. The subsequent stress increment will be small, even for larger changes in the strain. After this load step, a regular unloading process might be applied as shown if unloading continues. The stress-strain relationship in the incremental solution for the next load step will be consistent with that used in the computation of the stress increment, and the internal nodal force F by the principle of virtual work. As a result, convergence of the numerical solution is enhanced. If unloading continues, however, the normal change to the elastic state will occur. On the other hand, when loading occurs, the tangent stiffness matrix follows the flow theory of plasticity.

As is known, the stress-strain relationship for the flow theory of plasticity, in rate form, is as follows:

$$\dot{\epsilon}_{\alpha\beta} = \dot{\epsilon}^e_{\alpha\beta} + \dot{\epsilon}^p_{\alpha\beta} \quad (1)$$

wherein $$\dot{\epsilon}^e_{\alpha\beta} = \frac{1}{E}[(1+\nu)G_{\alpha\gamma}G_{\beta\epsilon} - \nu G_{\alpha\beta}G_{\gamma\epsilon}]\sigma^{\gamma\delta*} \quad (2)$$

and $$\dot{\epsilon}^p_{\alpha\beta} = \quad (3)$$

$$\frac{F}{E} \frac{1}{\sigma_e^2} \left(\frac{1+2R}{1+R}\right)^2 \left[G_{\alpha\rho}G_{\beta\gamma}\sigma^{\rho\gamma} - \frac{R}{R+1}G_{\alpha\beta}G_{\rho\gamma}\sigma^{\rho\gamma}\right]*$$

$$\left[G_{km}G_{ln}\sigma^{mn}\sigma^{kl*} - \frac{R}{R+1}G_{mn}\sigma^{mn}G_{kl}\sigma^{kl*}\right]$$

wherein E is Young's modulus. $F = E/E_t(\sigma_e) - 1$, $E_t(\sigma_e)$ is the tangent modulus at the equivalent stress level $\sigma_e$ in the uniaxial stress-strain curve. R is the transversely anisotropic parameter, $G_{\alpha\beta}$ is the metric tensor for the surface, and $$\sigma^{\alpha\beta*} = \dot{\sigma}^{\alpha\beta} + G^{\alpha\gamma}\sigma^{\beta\delta}\dot{\epsilon}_{\gamma\delta} + G^{\beta\gamma}\sigma^{\alpha\delta}\dot{\epsilon}_{\gamma\delta} \quad (4)$$

and $$\sigma_e^2 = \quad (5)$$

$$\frac{1+2R}{1+R}\left[G_{\alpha\rho}G_{\beta\gamma}\sigma^{\alpha\beta}\sigma^{\rho\gamma} - \frac{R}{1+2R}G_{\alpha\beta}\sigma^{\alpha\beta}G_{\rho\gamma}\sigma^{\rho\gamma}\right]$$

Rearranging equations (1) through (5), the stress-strain relationship for the flow theory of plasticity can be rewritten, in matrix form as $\{\dot{\epsilon}\} = [C]\{\dot{\sigma}\}$, and in increment form as $\{\Delta\epsilon\} = [C]\{\Delta\sigma\}$. For the incremental (decremental) deformation theory. E is replaced by the secant modulus $E_s$, and $\nu$ is replaced by $\nu_s$, wherein $$\nu_s = \nu\frac{E_s}{E} + \frac{R}{1+R}\left(1 - \frac{E_s}{E}\right) \quad (6)$$

Inverting the matrix yields the material matrix used in the finite element analysis (displacement method): $\{\Delta\sigma\} = [D]\{\Delta\epsilon\}$, wherein $[D] = [C]^{-1}$. It should be noted that the incremental deformation theory of plasticity is utilized only at the transition from the elastic to the plastic state. Otherwise, the flow theory is utilized.

Referring once again to FIG. 5a, at step 60 the internal nodal forces and the frictional force vector for each contact node are determined. In the preferred embodiment, the nodal forces for each element are computed based on the updated material matrix. Internal nodal forces (there are no external forces acting for the die closure analysis except at the contact nodes) are computed by assembling all element nodal forces. For free nodes (nodes that are not contacting), the internal nodal forces F are equal to the unbalanced forces since there are no external forces. For contact nodes, the frictional forces T, which can be considered as the external forces at the contact nodes, are determined, as well as positional constraints holding the node on the tool surface. In the preferred embodiment, the frictional forces T are determined based on the Coulomb friction law:

$$T = \frac{\mu\rho V}{|V|} \quad (7)$$

where $\mu$ is the coefficient of friction, $\rho$ is the normal pressure and V is the relative velocity vector a contact node with respect to a tool surface in the finite element model.

Figure 8:
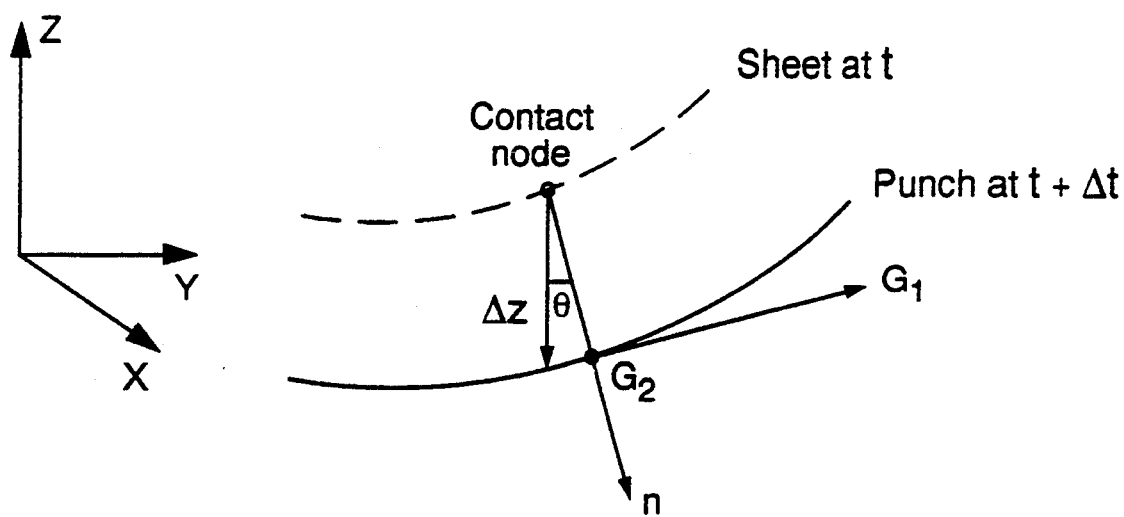
FIG. 8 is an illustration of sheet metal movement due to punch travel and an associated local Cartesian coordinate system for determining frictional force.

As shown in FIG. 8, a local Cartesian coordinate system can be established with the normal n and two tangent vectors $G_1$ and $G_2$ to the tool surface at the contact node. Positional constraints hold the node in this tangent plane, determined by $G_1$ and $G_2$ at that instant. It should be noted that the frictional force T lies on the tangent plane determined by the vectors $G_1$ and $G_2$. To compute the normal n, only the slopes of the tool surface are required. To constrain a contact node slide along the tool surface, (i.e. $|V|$ much different from 0), a boundary value problem is formulated with the displacement increment as:

$$\Delta z^* n - |\Delta z|^* \cos \Theta \quad (8)$$

where $|\Delta z|$ is the amount of penetration into the tool surface in the z-direction, specified along n and the external forces $T^* G_i$ specified along $G_i$ with $i = 1,2$. In the load step, an iterative process to solve for equilibrium, expressed approximately by the linear system:

$$K_t^* \Delta\Delta U - T - F \quad (9)$$

where F is the internal nodal force due to deformation at a contact node, can be performed until the right hand side is zero, i.e., equilibrium is satisfied at each load step. It should be appreciated that during this process, the tangent stiffness matrix $K_t$ will be kept symmetrical.

With reference to FIG. 5a, at step 62 the draw-bead forces and the tangent stiffness of the equivalent spring for the draw-bead are determined. The draw-bead is preferably modelled by a line of nonlinear springs which have been discretized and attached to nodes of the periphery of the sheet metal. These nonlinear springs can be characterized as shown in FIG. 7. Spring force $F_o$ is determined analytically or by experiment. As shown in FIG. 7, in the flat region of the spring function, a small slope is introduced to make the tangent stiffness matrix non-singular (i.e. the solution to the linear system is unique). A line of nonlinear elastic springs are preferably used instead of an elastic-plastic spring, which would cause oscillations in the quasi-static solution during the analysis of the forming process due to the same type of inconsistency as in the material properties.

Figure 5B:
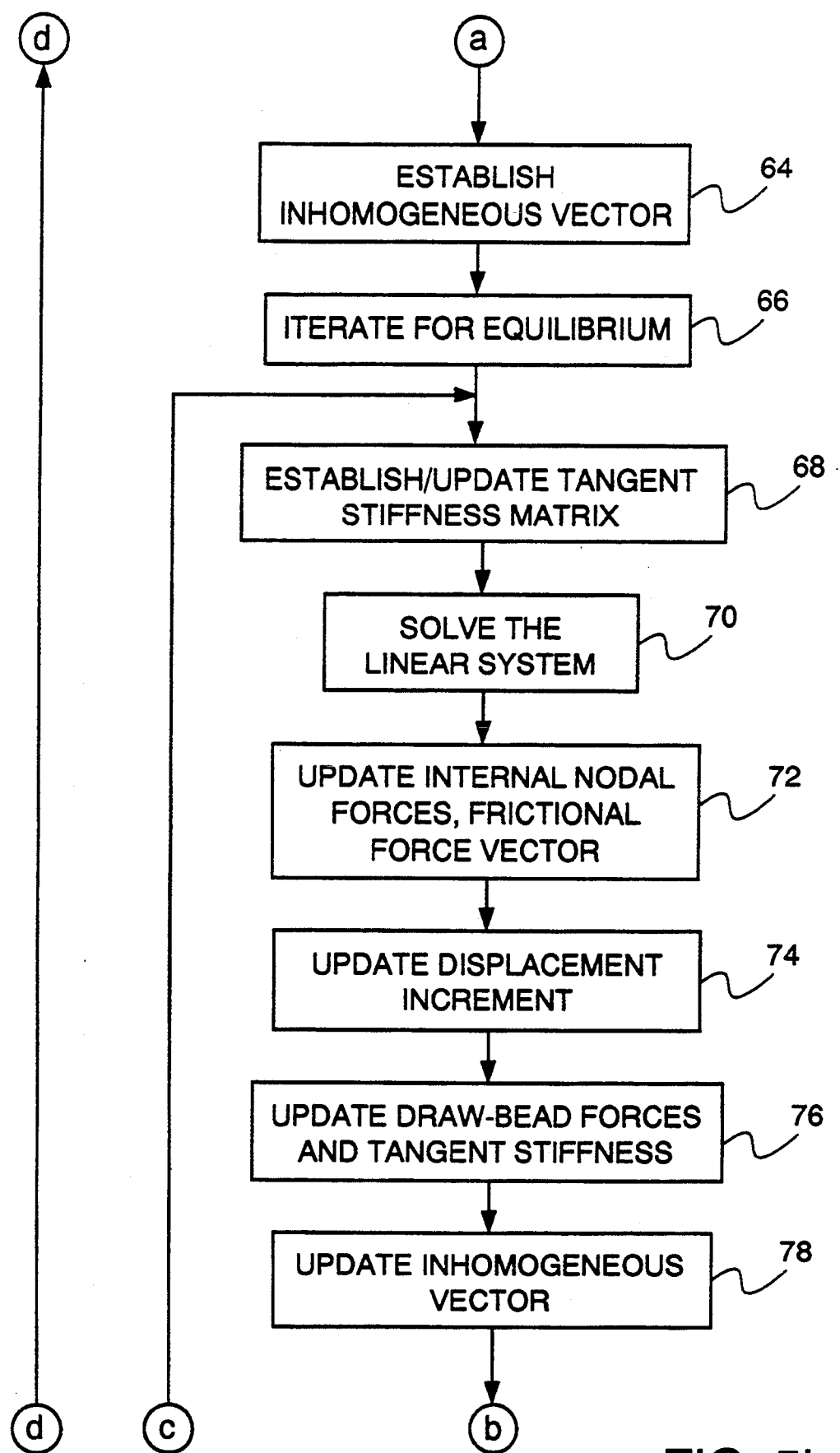

Referring now to FIG. 5b, at step 64 the inhomogeneous vector (T−F), also called the right-hand side vector, for the linear system of the incremental equilibrium equations is established. At step 66, an iteration for equilibrium is initiated. In the preferred embodiment, the iteration involves force balancing utilizing the Newton-Raphson method. At step 68, the tangent stiffness matrix is established/updated for each element, utilizing the material matrix described above with reference to step 60. All elemental tangent stiffness matrices are assembled to form a global tangent stiffness matrix $K_t$. Step 68 also involves the transformation of $K_t$ to the local Cartesian coordinate system associated with each contact node. The diagonal elements of the global tangent stiffness matrix are then modified, to take care of displacement boundary conditions, to obtain a modified global tangent stiffness matrix, $K_{tm}$. These displacement boundary conditions include constraints due to symmetry. Another boundary condition is that nodes inside the binder ring must contact the binder surface. For contact nodes, normal displacement is specified to be the amount of penetration in the normal direction of the tool surface for the first iteration and zero for subsequent iterations, since the normal displacement is satisfied and only the equilibrium in the tangential direction is not satisfied. Lastly, step 68 entails similarly transforming the inhomogeneous vector T−F to the local Cartesian coordinate system for contact nodes and, modifying the inhomogeneous vector to take care of the displacement boundary conditions, to obtain a modified inhomogeneous vector P. It should be appreciated that a set of linear simultaneous equations are established at step 68.

In each load step, an iterative process is used to find the displacement increment ($\Delta U$) so as to satisfy the equilibrium. The corrections to the displacement increment ($\Delta\Delta U$), which occur every iteration, are expressed by the following linear system and solved at step 70:

$$K_{tm} * \Delta\Delta U = -P \qquad (10)$$

Thus, an estimated change in position is obtained by solving the stiffness equation for $\Delta\Delta U$. Preferably, the simultaneous equations are solved by the Gaussian elimination method.

With continuing reference to FIG. 5b, at step 72, the internal nodal forces and the frictional force vector for each contact node is updated. This updating includes the operations discussed above with reference to step 60, except the material matrices are not updated and the directions of the frictional forces are not changed.

At step 74 of FIG. 5b, the displacement increment $\Delta U$ is updated as follows:

$$\Delta U = \Delta U + \Delta\Delta U \qquad (11)$$

Figure 9:
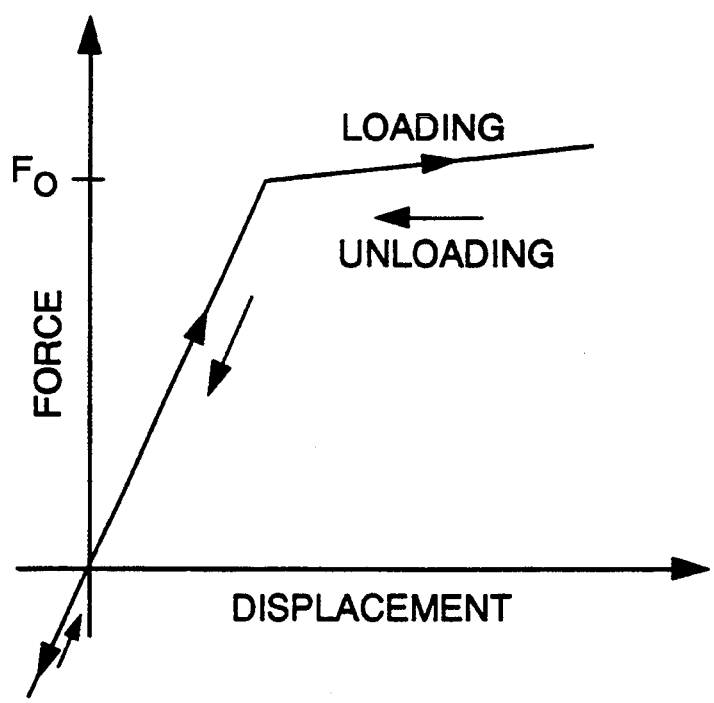
FIG. 9 is an graphical illustration of a nonlinear elastic spring for use with the present invention for modelling a draw-bead.

At step 76, the draw-bead forces and the tangent stiffness of the equivalent spring for the draw-bead are updated. As previously discussed with reference to step 62, the draw-bead is preferably modelled by a line of nonlinear elastic springs, the springs having a spring characteristic best shown in FIG. 9. At step 78, the inhomogeneous vector P is updated for the linear system.

Figure 5C:
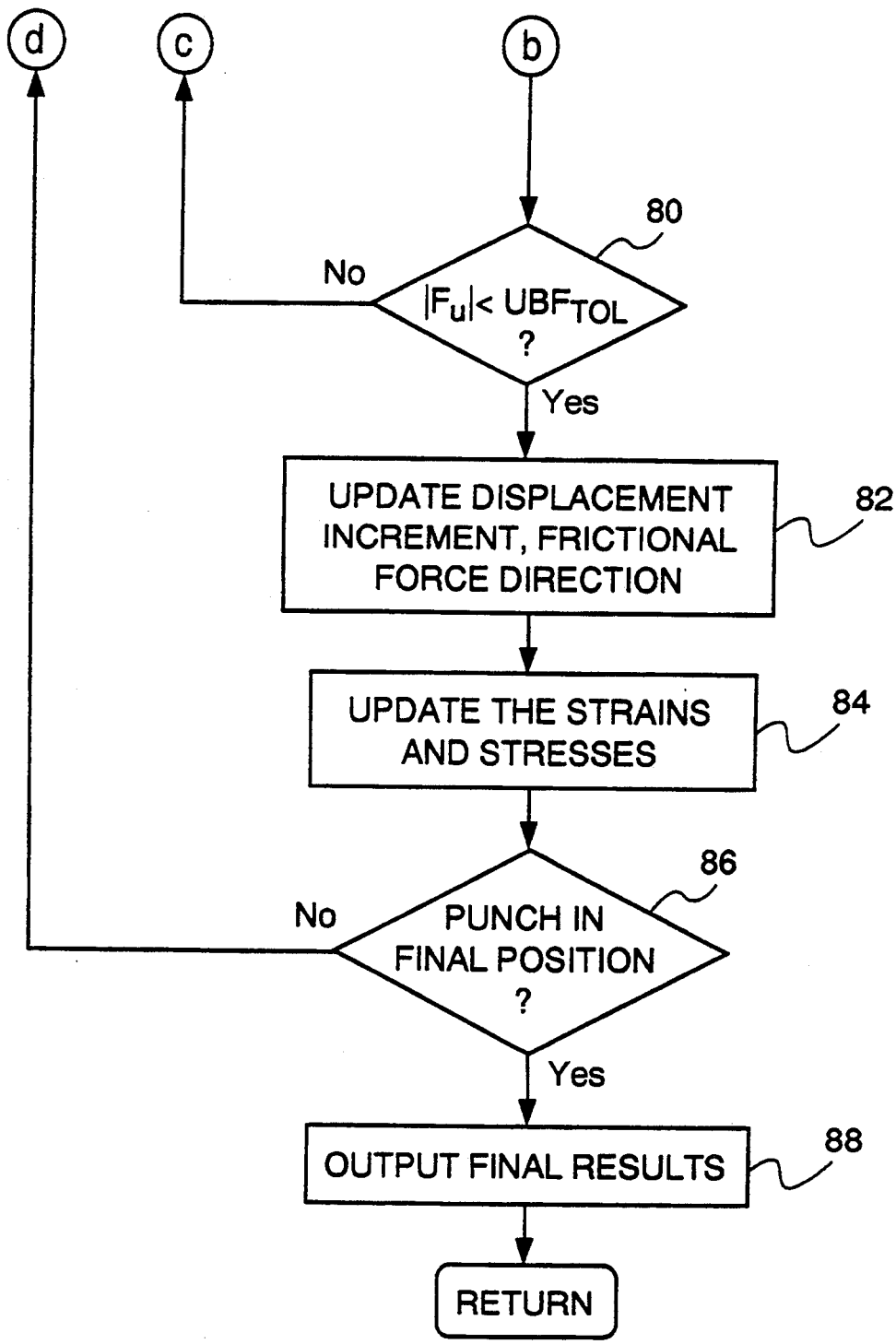

Referring now to FIG. 5c, at step 80 the unbalanced force magnitude $|F_u|$ is compared to $UBF_{TOL}$, a predetermined tolerance. If the unbalanced force is too high, control flow jumps to step 68 of FIG. 5b, as shown. If the unbalanced force is small enough, the total displacement U is updated at step 82 for the next load step as follows:

$$U = U + \Delta U \qquad (12)$$

Figure 10:
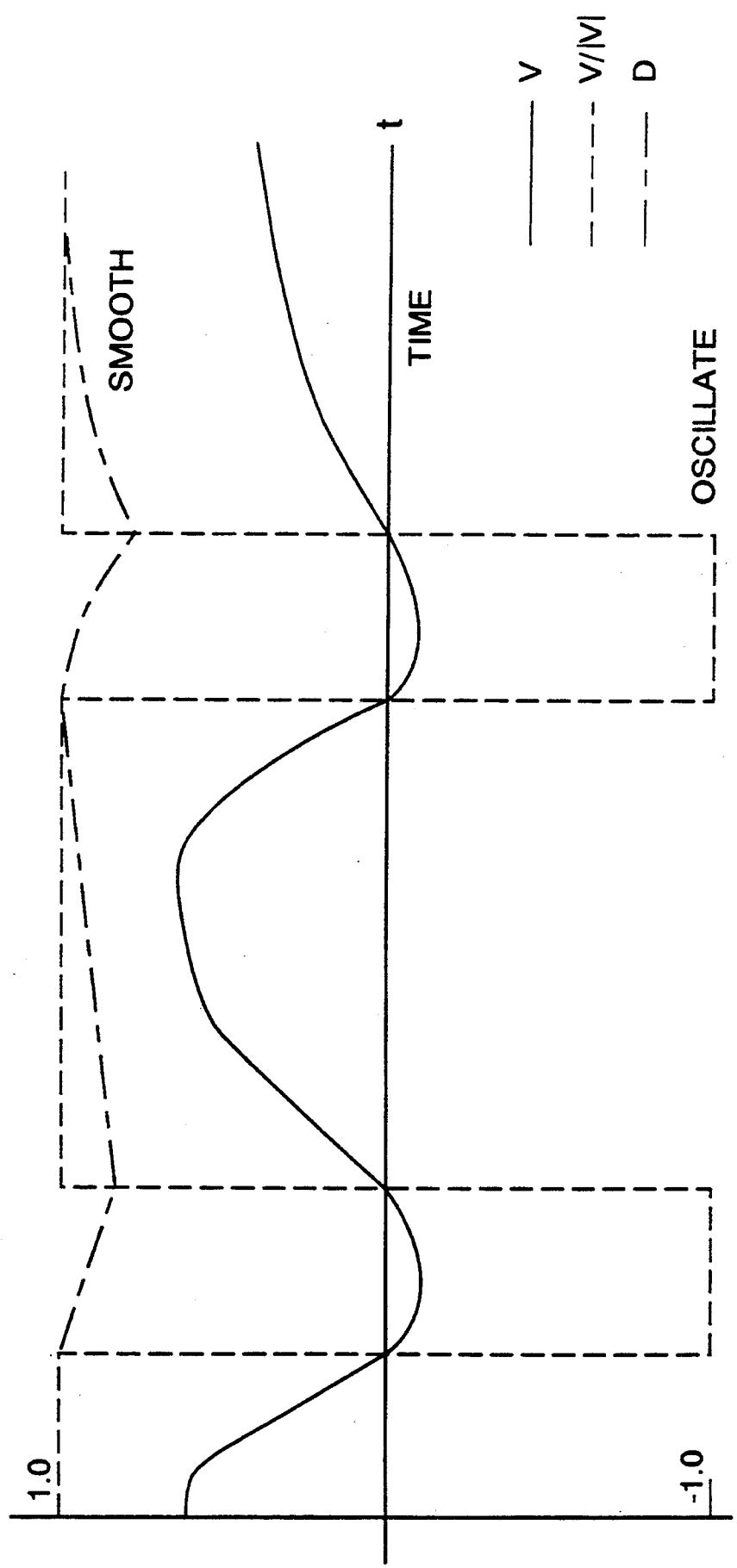
FIG. 10 is a graphical illustration of the filtered relative velocity vector (D) of the present invention to smooth discontinuities in the relative velocity vector $(V/|V|)$.

The frictional force direction at each contact node is also updated at step 82 by filtering the relative velocity vector at a contact point. This is done so as to avoid frictional force oscillations due to the change of direction of the relative velocity vector, as shown in FIG. 10, which can cause non-convergence in the iterative solution of equation (9). In the preferred embodiment, a low pass filter is utilized to filter the relative velocity vector:

$$D(t + \Delta t) = \frac{0.2 V}{|V|} + 0.8 D(t) \qquad (13)$$

wherein $D(\Delta t)$ is initially set equal to $V/|V|$. This D is utilized instead of $V/|V|$ in equation (7) above to compute the frictional force vector. It should be appreciated that this method has another advantage since there is no need to treat a stuck contact node (i.e. $|V|$ close to 0) separately from a sliding contact node. Changing from stuck nodes to slipping nodes, and vice versa, can cause convergence problems as well.

Figure 11A:
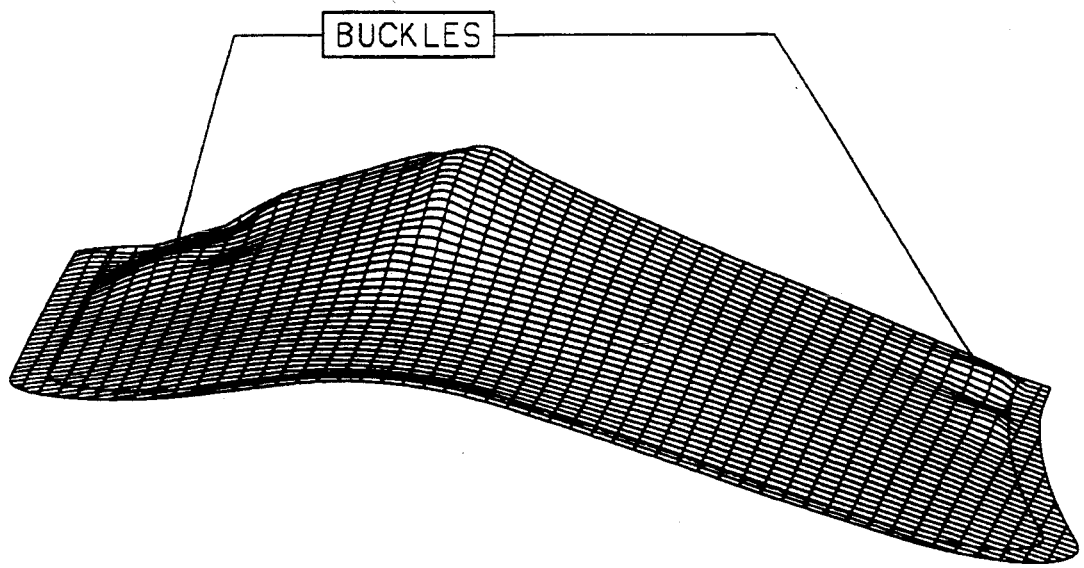
FIG. 11a is a graphical representation of an automotive body panel with buckles, or wrinkles, due to unacceptable compressive stress distribution detected by the present invention.

Once the displacement has been updated at step 82, based on the $\Delta U$, the stress and strain are updated according to conventional methods, such as according to the material matrix and the strain increment/displacement increment relationship, respectively. At step 86 the computer determines whether the punch is at its final position. If it is not, control flow returns to step 56 for another load step. If the punch is in its final position, the final results, the predicted deformation and stress distribution, are output at step 88. For example, FIG. 11a is a graphical representation of an automotive body panel suffering from an unacceptable compressive stress distribution, resulting in wrinkles, or buckles (illustrated by the non-parallel lines).

Figure 11B:
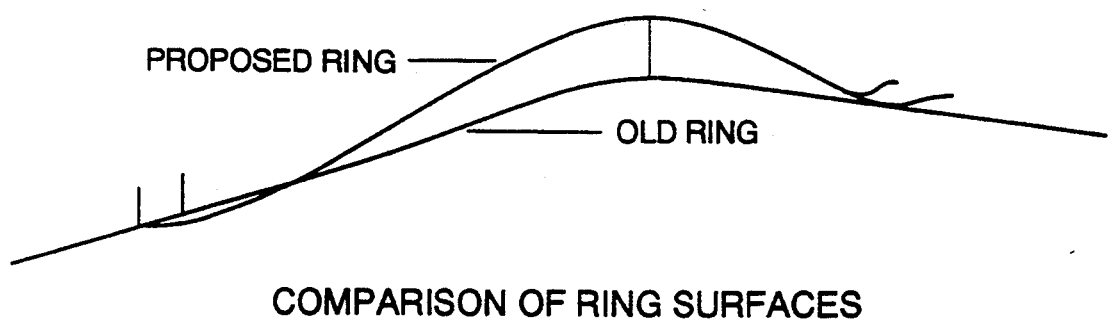
FIG. 11b is graphical comparison of an original binder surface associated with the defective body panel shown in FIG. 11a and a redesigned binder surface.
Figure 11C:
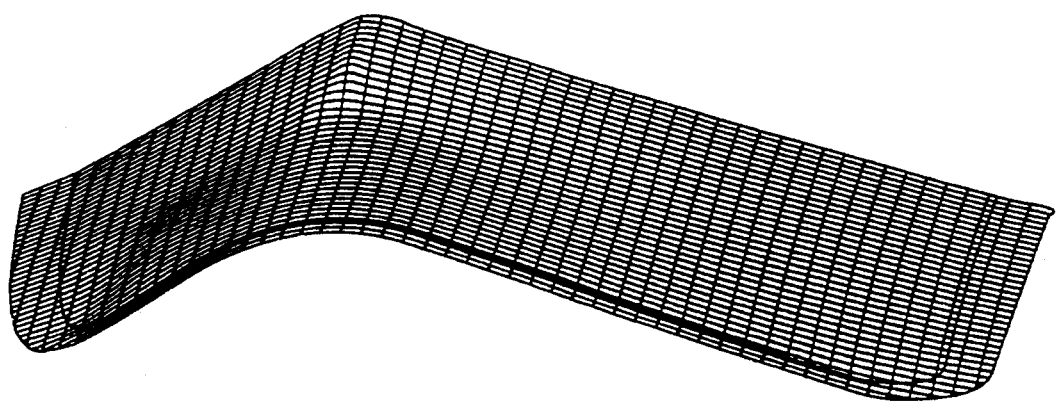
FIG. 11c is a graphical representation of a defect-free automotive body panel associated with the redesigned binder surface of FIG. 11b.

Referring again to FIG. 3, once the punch and die contact analysis of step 36 is completed, at step 38, the binder surface, draw wall and draw-beads can be redesigned and reconstructed based on the final results so as to prevent failures such as splitting, thinning, buckling and wrinkling of the sheet metal. For example, FIG. 11b is a graphical comparison of the original binder surface and a redesigned and reconstructed binder surface, resulting in the automotive body panel shown in FIG. 11c, a defect-free body panel.

It is understood that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method for aiding sheet metal forming tool design, for use with a computer including memory, and forming tools including a draw die, punch and binder having surfaces designed to form the sheet metal into a part, the sheet metal being represented as a mesh including a plurality of nodes and associated elements, the method comprising the steps of:

numerically determining by the computer the sheet metal mesh nodes contacting the punch and die tool surfaces due to the punch advancing to form the part and applying a position displacement increment to the nodes;

determining by the computer a stress state at at least one sampling point associated with the elements, so as to determine whether the stress state is unloading based on an incremental deformation theory of plasticity;

determining by the computer for each unloading sampling point when the sampling point should change from a plastic state to an elastic state, so as to enhance convergence of a numerical solution for the displacement increment to an equilibrium value; and reconstructing at least one of the draw die, punch, and binder surfaces based on the stress state to prevent part failures.

2. The method of claim 1 wherein the step of determining a stress state includes the step of:

determining by the computer a strain increment at the at least one sampling point based on the displacement increment and a strain-displacement relationship.

3. The method of claim 2 further comprising the step of:

determining by the computer a stress increment based on a stress-strain relationship, the stress state unloading at the at least one sampling point if the stress increment is negative.

4. The method of claim 3 further comprising the step of:

determining by the computer the total stress at each sampling point in the sheet metal based on the stress increment.

5. A method for aiding sheet metal forming tool design, for use with a computer including memory and forming tools including a draw die, punch and binder with a drawbead, the forming tools having surfaces designed to form the sheet metal into a part, the sheet metal being represented as a mesh including a plurality of nodes, the sheet metal mesh also including at least one spring node located at a boundary of the sheet metal, the method comprising the steps of:

numerically determining by the computer the sheet metal mesh nodes contacting the punch and die tool surfaces due to the punch advancing to form the part and applying a position displacement increment to the nodes;

modelling the drawbead by the computer as a plurality of nonlinear elastic springs, at least one nonlinear elastic spring being positioned at the at least one spring node and exerting an external force on the spring node which varies with nodal displacement, so as to minimize discontinuities in the spring force during unloading of the spring, thereby enhancing convergence of a numerical solution for the displacement increment to an equilibrium value;

determining by the computer a strain and a stress distribution in the sheet metal due to the punch advancing to form the part; and reconstructing at least one of the forming tool surfaces based on the strain and the stress distribution, so as to prevent part failures.

6. The method of claim 5 wherein the step of reconstructing comprises:

reconstructing the draw-bead based on the strain and the stress distribution, so as to prevent part failures.

7. A method for aiding sheet metal forming tool design, for use with a computer including memory, and forming tools including a draw die, punch and binder having surfaces designed to form the sheet metal into a part, the sheet metal being represented as a mesh including a plurality of nodes and associated elements, the method comprising the steps of:

numerically determining by the computer the sheet metal mesh nodes contacting the punch and die tool surfaces due to the punch advancing to form the part and applying a position displacement increment to the nodes;

filtering by the computer a relative velocity vector associated with each contact node with respect to the punch and die tool surfaces;

determining frictional forces by the computer at the contact node utilizing the filtered relative velocity vector, to avoid oscillations due to the change in direction of the relative velocity vector of the contact node, thereby enhancing convergence of a numerical solution for the displacement increment to an equilibrium value;

determining by the computer a strain and a stress distribution in the sheet metal due to the punch advancing to form the part; and reconstructing at least one of the forming tool surfaces based on the strain and the stress distribution, so as to prevent part failures.

8. The method of claim 7 wherein the step of filtering is done utilizing a low pass filter characterized by:

$$D(t + \Delta t) = \frac{0.2V}{|V|} + 0.8D(t)$$

wherein t represents time, V is the relative velocity vector of the contact node with respect to the punch or die tool surface, D represents the low pass filtered relative velocity vector, so as to determine the frictional force at the contact nodes according to:

$$T = -\mu pD$$

wherein $\mu$ represents the coefficient of friction associated with the sheet and $\rho$ is pressure.

9. A system for aiding sheet metal forming tool design, for use with forming tools including a draw die, punch and binder having surfaces designed to form the sheet metal into a part, the sheet metal being represented as a mesh including a plurality of nodes and associated elements, the system comprising:

input means for entering data representing the sheet metal mesh;

means for storing the entered data and a predetermined instruction set; and a processor in communication with the input means and the means for storing, wherein the processor is operative to numerically determine the sheet metal mesh nodes contacting the punch and die tool surfaces due to the punch advancing to form the part and applying a position displacement increment to the nodes, to determine a stress state at at least one sampling point associated with the elements, so as to determine whether the stress state is unloading based on an incremental deformation theory of plasticity, and to determine for each unloading sampling point when the sampling point should change from a plastic state to an elastic state, so as to enhance convergence of a numerical solution for the displacement increment to an equilibrium value.

10. The system of claim 9 wherein the binder is reconstructed to prevent part failures based on the stress state.

11. The system of claim 9 wherein the the processor is further operative to determine a strain increment at the at least one sampling point based on the displacement increment and a strain-displacement relationship.

12. The system of claim 11 further comprising means for determining a stress increment based on a stress-strain relationship, the stress state unloading at the at least one sampling point if the stress increment is negative.

13. The system of claim 12 further comprising means for determining the total stress at each sampling point in the sheet metal based on the stress increment.

14. The system of claim 13 wherein the binder is reconstructed based on strain and stress in the sheet metal, so as to prevent part failures.

15. A system for aiding sheet metal forming tool design, for use with forming tools including a draw die, punch and binder with a drawbead, the forming tools having surfaces designed to form the sheet metal into a part, the sheet metal being represented as a mesh including a plurality of nodes, the sheet metal mesh also including at least one spring node located at a boundary of the sheet metal, the system comprising:

input means for entering data representing the sheet metal mesh;

means for storing the entered data and a predetermined instruction set; and a processor in communication with the input means and the means for storing for numerically determining the sheet metal mesh nodes contacting the punch and die tool surfaces due to the punch advancing to form the part and means for applying a position displacement increment to the nodes, and for modelling the drawbead as a plurality of nonlinear elastic springs, at least one nonlinear elastic spring being positioned at the at least one spring node and exerting an external force on the spring node which varies with nodal displacement, so as to minimize discontinuities in the spring force during unloading of the spring, thereby enhancing convergence of a numerical solution for the displacement increment to an equilibrium value.

16. The system of claim 15 further comprising means for determining a strain and a stress distribution in the sheet metal due to the punch advancing to form the part, wherein the draw-bead is reconstructed based on the strain and the stress distribution, so as to prevent part failures.

17. A system for aiding sheet metal forming tool design, for use with forming tools including a draw die, punch and binder having surfaces designed to form the sheet metal into a part, the sheet metal being represented as a mesh including a plurality of nodes and associated elements, the system comprising:

input means for entering data representing the sheet metal mesh;

means for storing the entered data and a predetermined instruction set; and a processor in communication with the input means and the means for storing for numerically determining the sheet metal mesh nodes contacting the punch and die tool surfaces due to the punch advancing to form the part and applying a position displacement increment to the nodes, for filtering a relative velocity vector associated with each contact node with respect to the punch and die tool surface surfaces, and for determining frictional forces at the contact node utilizing the filtered relative velocity vector, to avoid oscillations due to the change in direction of the relative velocity vector of the contact node, thereby enhancing convergence of a numerical solution for the displacement increment to an equilibrium value.

18. The system of claim 17 wherein the means for filtering includes low pass filter means characterized by:

$$D(t + \Delta t) = \frac{0.2V}{|V|} + 0.8D(t)$$

wherein t represents time, V is the relative velocity vector of the contact node with respect to the punch or die tool surface, D represents the low pass filtered relative velocity vector, so as to determine the frictional force at the contact nodes according to:

$$T = -\mu \rho D$$

wherein $\mu$ represents the coefficient of friction associated with the sheet and $\rho$ is pressure.

* * * * *